United States Patent [19]
Smiley

[11] Patent Number: 5,629,993
[45] Date of Patent: May 13, 1997

[54] COMPACT OPTICAL SWITCH

[75] Inventor: John O. Smiley, Ottawa, Canada

[73] Assignee: JDS Fitel Inc., Ottawa, Canada

[21] Appl. No.: 520,702

[22] Filed: Aug. 29, 1995

[51] Int. Cl.⁶ .................................. G02B 6/26; G02B 6/42
[52] U.S. Cl. ...................................... 385/22; 385/25
[58] Field of Search ........................... 385/22, 25, 26

[56] References Cited

U.S. PATENT DOCUMENTS

| | | | |
|---|---|---|---|
| 4,378,144 | 3/1983 | Duck et al. | 385/25 |
| 5,031,986 | 7/1991 | Mori | 385/25 |
| 5,463,704 | 10/1995 | Ziebol | 385/25 |

FOREIGN PATENT DOCUMENTS 2 634 030  7/1988  France ................. G02B 6/24

Primary Examiner—Rodney B. Bovernick
Assistant Examiner—Robert E. Wise
Attorney, Agent, or Firm—Neil Teitelbaum & Associates

[57] ABSTRACT

An optical switch has a stepping motor with a fiber faceplate on which are mounted end portions of output optical fibers terminating in GRIN lenses. The end portions are arranged along a pitch circle. The faceplate is spaced from the stepping motor and the diameter of the pitch circle is smaller than the diameter of the stepping motor, the output fibers diverging from the faceplate towards the motor and beyond in a space-saving arrangement. The stepping motor drives a movable arm with attached end portion of an input optical fiber, also with a GRIN lens, into one of a plurality switching positions. The connection between the fibers and the lenses and also the relative axial arrangement of the paired lenses in the switching positions is offset to reduce or minimize the reflection of light transmitted from the input fiber to the output fiber, back to the input fiber.

4 Claims, 3 Drawing Sheets

COMPACT OPTICAL SWITCH

FIELD OF THE INVENTION

This invention relates to optical switching devices and more particularly, to a fiberoptic switch for optically connecting an optical fiber, or generally a waveguide, with one or more other optical fibers or waveguides.

BACKGROUND OF THE INVENTION

Optical switches which afford an optical connection of a single input waveguide with a plurality of output waveguides are known in the art. Devices described in U.S. Pat. No. 4,896,935 and U.S. Pat. No. 4,834,488 to Lee operate by rotating the end portions of certain fibers to align them optically with other fibers, all the fibers (or at least their end portions to be aligned) being positioned in a common plane. U.S. Pat. No. 4,378,144 to Duck et at. proposes an arrangement wherein a faceplate comprising a number of collimating lenses along a pitch circle is attached directly to a stepping motor, the shaft of the motor being coaxial with the pitch circle. A rotatable arm with a collimating lens is attached to the shaft for rotation along the pitch circle, with a small distance therebetween, so that the lens of the arm can be optically connected with the lenses on the faceplate when the rotatable arm is moved by means of the shaft of the stepping motor. An optical input fiber is connected to the collimating lens of the arm and a plurality of optical output fibers is attached to the respective collimating lenses on the faceplate for a switching operation when the rotatable arm moves from one position to another.

While the device of Duck et at. is useful, it has certain disadvantages. Since the output fibers are arranged parallel to the axis of the stepping motor and surround the motor, and since the input fiber is rotated along the pitch circle for alignment with the output fibers, the pitch circle must have a diameter at least equal to the diameter of the stepping motor. This creates a demand for space as the face, plate has a larger diameter than the respective size of the stepping motor, and also increases the possibility of an alignment error because of a relatively large radius of the pitch circle.

An attempt to solve the above problems was made in U.S. Pat. No. 5,317,659 to Lee. The end portions of a number of optical fibers are fixed onto the conical surface of a supporting frame. The end portion of a movable fiber is rotated about the axis of a conical surface so that the end portion of the movable fiber is aligned with one of the fixed fibers.

While the device of U.S. Pat. No. 5,317,659 overcomes the problem of the size of the faceplate of Duck '144, the device itself is rather difficult to manufacture and may be prone to alignment problems.

SUMMARY OF THE INVENTION

It is an object of the present invention to provide an optical switching device which combines a relatively compact design with a high operational accuracy and reliability as well as a relative ease of manufacture.

According to the invention, an optical switching device is provided which has a light input side and a light output side and which comprises, a motor having a shaft, a plurality of optical fibers on one side of the device, each fiber having a fixed end portion, the fixed end portions being located in spaced-apart predetermined positions substantially parallel to the axis of the shaft thus defining a substantially cylindrical imaginary surface the diameter of which defines a pitch circle, an optical fiber on the other side of the device, the fiber having a movable end portion, a means associated with the motor far moving the movable end portion of the optical fiber around an are of the pitch circle so as to reach optically connecting positions with respective fixed end portions of the optical fibers, wherein the diameter of the pitch circle is smaller than the size of the stepping motor in a plane perpendicular to its shaft and the fixed end portions are axially spaced from the motor by a distance related to the minimum acceptable bending radius of the optical fibers on the one side of the device.

The minimum acceptable bending radius of the fibers on the one side of the device is a bending radius at which said optical fibers on the one side can bend without the risk of breaking, while not causing significant attenuation o light signal in the respective fibers, to diverge from their fixed portions and bypass the stepping motor.

Preferably, the end portions of the fibers have gradient index (GRIN) lenses which are connected to the end portions to collimate light passing from or to the respective fibers.

In a preferable embodiment of the invention, the radius of rotation of the movable end portion is different than the radius of the, pitch circle of the fixed end portions whereby the axes of the corresponding lenses are offset, the difference being selected to minimize a reflection of the fight signal from the GRIN lens on the output fiber while enabling effective fight transmission between the input and the output fiber.

BRIEF DESCRIPTION OF THE DRAWINGS

The invention will now be explained and described in more detail in conjunction with accompanying drawings in which.

DETAILED DESCRIPTION OF THE INVENTION

Figure 4:
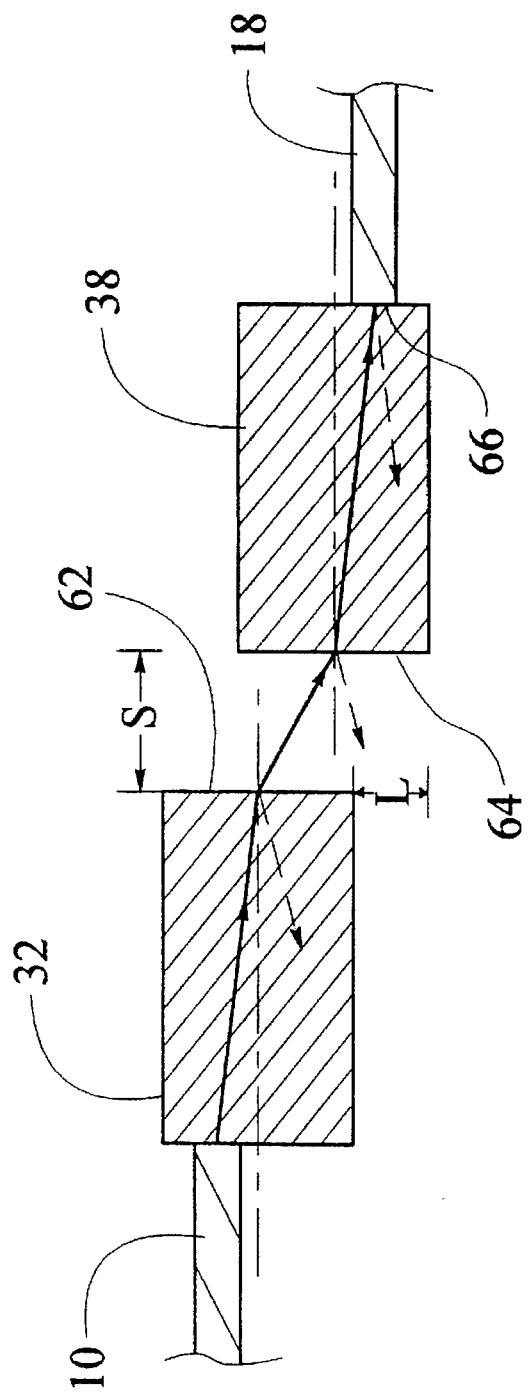
FIG. 4 is a schematic cross-sectional view illustrating fiber-to-fiber arrangement in the device of the invention using a pair of gradient index (GRIN) lenses.

As shown in the drawings, an optical switching device has a light input side on which it comprises a single input optical fiber 10 which has an end portion 12 mounted in a fiber tube 14. On its light output side, the device has a number of output optical fibers 18. The device comprises a small-diameter stepping motor 20 which is attached to a faceplate 22 such that rotatable shaft 24 of the stepping motor 20 extends through the fixed faceplate. An arm 26 is secured to the shaft for rotation about the axis 28 of the shaft 24. The end portion 12 of the input fiber 10 is mounted to the arm 26 by means of a fiber tube 14 and terminates in a collimating gradient index (GRIN) lens 32, shown in FIG. 4 (known under a trademark SELFOC of Nippon Sheet Glass). The output optical fibers 18 are attached, in their end portions 19, to the faceplate 22 through a corresponding number of fiber tubes 16 attached to collimating GRIN lenses 38 which are mounted in holes 34 uniformly spaced along a pitch circle on the face 36 of the faceplate 22 as illustrated in FIG. 4.

The axes of the holes 34, defining the pitch circle, and the axis of a hole (accommodating the fiber tube 14) in the arm 26 are parallel to the axis 28 of the shaft 24 which facilitates the manufacture of the precision bores arid the alignment of the input fiber 10 with output fibers 18. The axis of the hole in the arm 26 may be offset relative to the pitch circle as explained hereinbelow in conjunction with FIG. 4.

Figure 1:
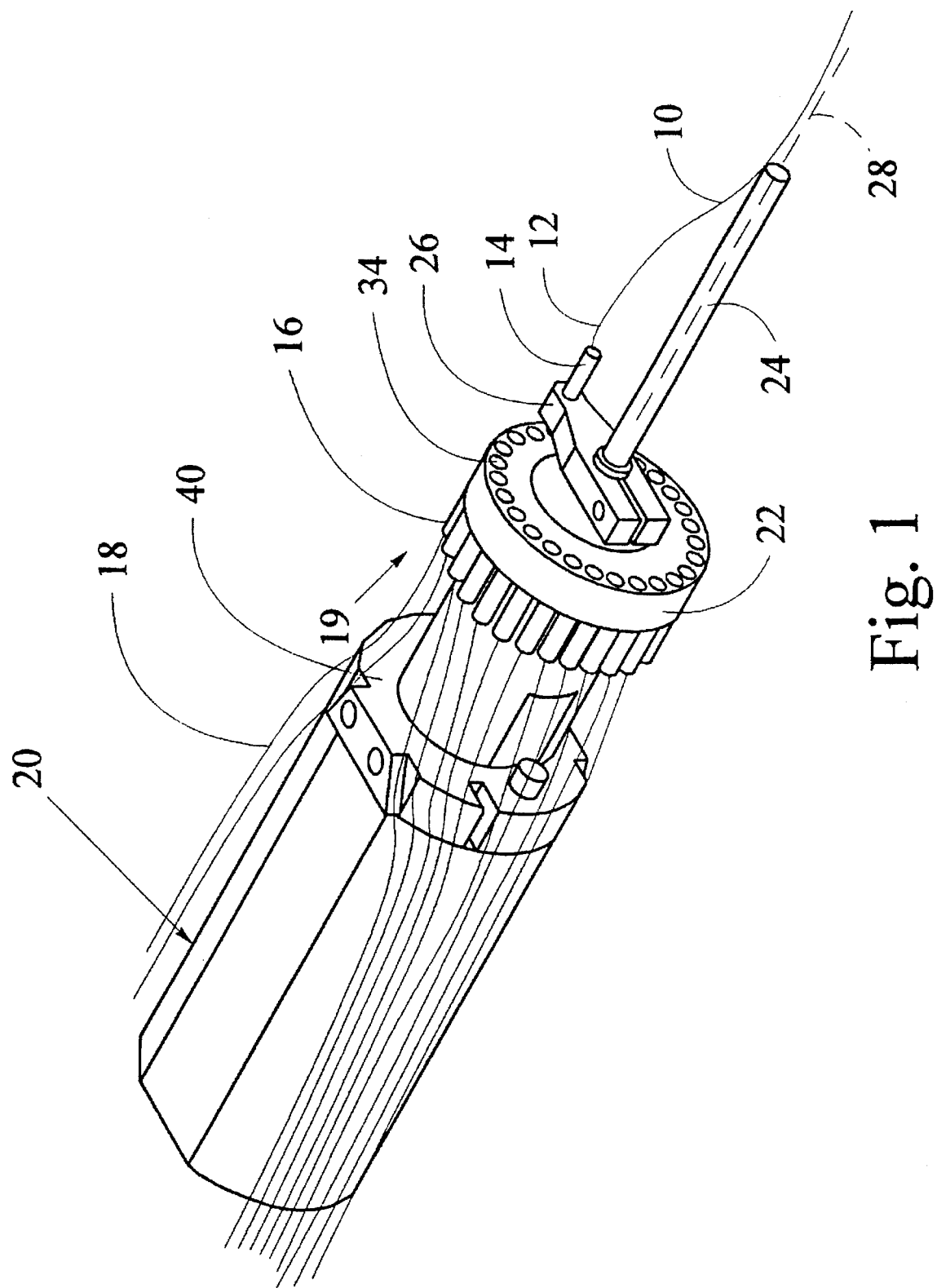
FIG. 1 is a perspective view of an embodiment of the switching device of the invention.
Figure 2:
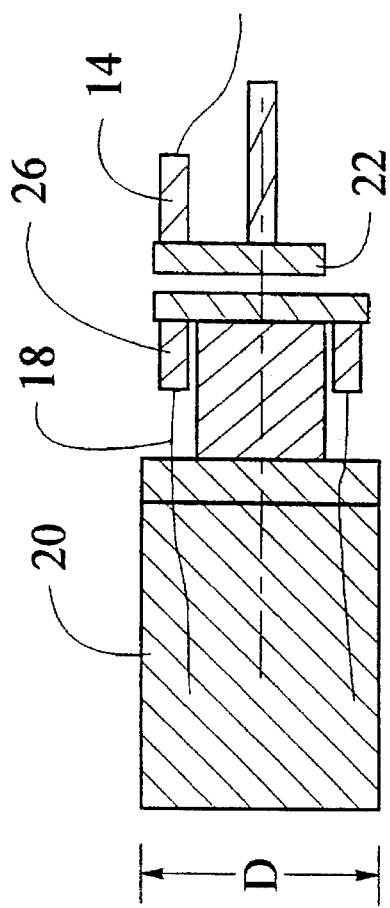
FIG. 2 is a schematic side view of the switching device.

It is seen from FIGS. 1 and 2 that the diameter of the pitch circle defined by the axes of the holes 34 is smaller than the diameter, or average cross-sectional size D, of the stepping motor 20 as measured perpendicularly to the axis 28. This difference in the diameters should be such that the external diameter of the faceplate 22 with its mounting 40 does not exceed the diameter, or average cross-sectional size D, of the stepping motor 20, or in other words, that the profile of the faceplate with the moving arm does not extend beyond the profile of the stepping motor as seen in the axial direction of the shaft.

Further, it is seen from FIGS. 1 and 2 that the faceplate 22, in contrast with the arrangement of U.S. Pat. No. 4,378,144 (FIGS. 1, 3 and 4) is axially spaced from the stepping motor 20 (or body of the switching device such as to allow the output optical fibers 18 to bend gently to diverge from their end portions towards the stepping motor and to bypass the motor (or the body of the device) contiguously with practically no space requirement, while the bending radius is large enough to prevent substantial attenuation of optical signal due to fiber bending.

Figure 3:
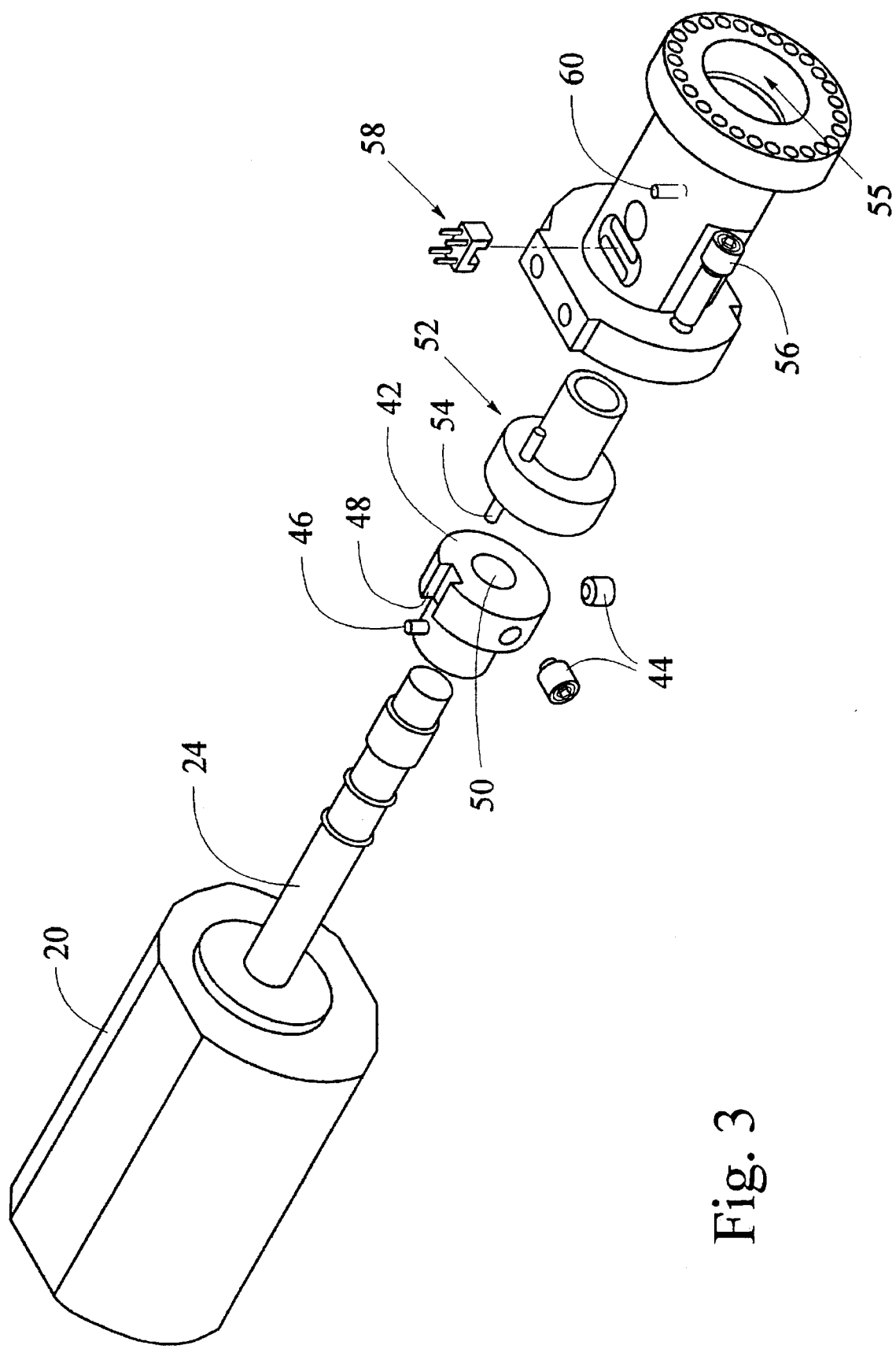
FIG. 3 is a perspective exploded view of the device.

FIG. 3 illustrates a stop mechanism of the device of the invention. It is advantageous to ensure that in selecting various switching positions of the arm 26, and thus of the end portion 12 of the input fiber 10, a rotary motion of the arm is limited to an arc, preferably totalling in both directions (clockwise and counterclockwise) 360° but typically not exceeding significantly the full circle. To this effect, according to the invention, a sensor collar 42 is adapted to be fixedly secured to the shaft 24 by means of set screws 44. The collar 42 has a pin, or flag 46 and an axial slot 48 on its outside diameter. An axial bore 50 in the sensor collar has a size corresponding to the diameter of the shaft 24. The sensor collar 42 is adjacent to stop collar 52 which is adapted to be slidably mounted on the shaft 24. The stop collar 52 has a pin 54 which extends on both sides of the collar 52 parallel to the axis 28 of the shaft 24 and is disposed such as to engage with its one side the slot 48. The width of the slot 48 is sufficiently larger than the diameter of the pin 54 to enable the pin to move within the slot during the rotation of the shaft.

The purpose of this arrangement is to allow a rotational movement of the shaft by 360° so as to enable optical connections along the entire pitch circle.

The stop collar 52, guided and positioned by the motor shaft, is dimensioned to be slidably and rotatably received in an axial bore 55 of the faceplate 22 which is adapted to be fixedly attached to the stepping motor by means of bolts 56 (only one is shown). Mounted in the body of the faceplate are an optical sensor 58 which is a shaft position indicator, and a pin 60 which extends radially into the axial bore 55 and, in operation, engages the pin 54 of the stop collar 52 on the side opposite to that of the pin 46. Sensor 58 may also be a magnetic or electrical sensor.

In operation, when a control unit (not shown) is given a signal corresponding to a particular switching position, the unit generates a number of electrical pulses to the stepping motor to reach that switching position. The rotation of the shaft 24 causes the sensor collar to rotate. Consequently, the stop collar 52 rotates as well up to a point when the pin 60 engages and stops the pin 54. This will not stop immediately the sensor collar because of some leeway for the pin 54 created by the size of the slot 48 in the sensor collar. The situation is reversed when the shaft rotates in the opposite direction. As a result, the combined arc travelled by the shaft and the arm 26 attached to it is at least 360°, making it possible to use the entire circumference of the faceplate for optical connections and easing the accuracy restriction on the end-of-travel sensing.

FIG. 4 illustrates the optical connection arrangement preferably used in the present invention. The signal light path is indicated with a solid line with arrows and the reflected light is shown with dotted lines. In a switching position, two GRIN lenses 32 and 38, corresponding to the input fiber and to an output fiber respectively, are arranged so that an axial spacing S and a radial spacing L are maintained therebetween. The fibers 10, 18 are connected to their respective lenses in an off-center manner. The mount of the offset is selected to force light to travel through the lenses at an angle, and thus minimize or reduce the possibility of backreflection of the light entering the GRIN lens 38 either from the glass/air interfaces 62, 64, or from the glass/glass interface 66 back to the input fiber 10. The radial spacing L and the spacing S between the GRIN lenses are also selected with the same purpose. As seen in FIG. 4, because of the graded index of refraction and off-center connection of the fibers to the lenses, light passes through the input GRIN lens 32 and enters the opposite GRIN lens 38 at an angle. This results in the reflected portion of light, indicated by reference numeral 62, being largely redirected away from the face of the input GRIN lens 32.

It is an advantage of the invention to provide an optical switching device with a relatively good alignment control and ease of manufacture, at least equal to that of Duck U.S. Pat. No. '144, while offering a space saving comparable to that of Lee U.S. Pat. No. '659. The parallel arrangement of the fixed end portions of the output fibers is preferable over a conical arrangement at least for the manufacturing reasons.

It will be appreciated that the designation of input and output side in the embodiment described is exemplary only. The path of flight can be reversed so that light travels from the plurality of fibers selectively to the single fiber (or a number of fibers) on the opposite side.

Various modifications can be made to the above exemplary embodiments without departing from the scope of the invention which is to be defined only by the appended claims.

What I claim is:

1. An optical switching device comprising:
a stationary fiber holding means,
a motor mounted to said stationary holding means on one side of said holding means, said motor having a shaft and disposed such that said shaft passes through said stationary fiber holding means,
a first optical fiber having an end portion,
a plurality of optical fibers each having an end portion, said end portions of said plurality mounted to said stationary holding means on said one side along a pitch circle,
a rotary fiber holding means mounted to said shaft on a second side of said stationary holding means for rotation relative thereto,
said end portion of said first optical fiber mounted to said rotary fiber holding means for selective optical alignment, substantially parallel to said shaft, with one of said plurality of optical fibers,
wherein said fixed fiber holding means and said pitch circle have a diameter smaller than the size of the motor in a plane perpendicular to said shaft and are distanced from said motor sufficiently to allow said plurality of fibers to bend away from said pitch circle and encompass said motor without breaking.

2. The switching device according to claim 1 wherein each end portion of said optical fibers comprises a gradient index lens to collimate light passing to or from said fibers, the optical axis of each lens being disposed substantially parallel to the axis of said shaft, each said end portion being connected to said lens at a point offset from the optical axis of the lens.

3. The switching device according to claim 2 wherein the axes of the respective lenses in optically switching positions are offset by a distance which is effective to reduce back-reflection of light to the input fiber.

4. The switching device of claim 1, further comprising means for allowing the rotation of the shaft of the motor in both clockwise and counterclockwise direction over a combined arc of at least 360° along the pitch circle.

* * * * *